United States Patent [19]

Page

[11] Patent Number: 4,957,844
[45] Date of Patent: Sep. 18, 1990

[54] LIQUID ELECTROSTATIC DEVELOPER CONTAINING MULTIBLOCK POLYMERS

[75] Inventor: Loretta A. G. Page, Newark, Del.

[73] Assignee: DXImaging, Lionville, Pa.

[21] Appl. No.: 331,306

[22] Filed: Mar. 31, 1989

[51] Int. Cl.$^5$ .............................................. G03G 9/12
[52] U.S. Cl. ................................... 430/115; 430/119; 430/137
[58] Field of Search ....................... 430/115, 119, 137

[56] References Cited

U.S. PATENT DOCUMENTS

| | | | |
|---|---|---|---|
| 4,473,629 | 9/1984 | Herrmann et al. | 430/114 |
| 4,599,291 | 7/1986 | Podszün et al. | 430/114 |
| 4,665,011 | 5/1987 | Padszün et al. | 430/114 |
| 4,820,605 | 4/1989 | El-Sayed | 430/115 |

Primary Examiner—John L. Goodrow

[57] ABSTRACT

Liquid electrostatic developer consisting essentially of
A. nonpolar liquid having Kauri-butanol value less than 30, present in major amount,
B. thermoplastic resin particles, average by area particle size less than 10 μm, consisting essentially of mixture (1) 80–95% by weight thermoplastic resin and (2) 20 to 5% by weight multiblock copolymer compound as defined, and
C. charge director compound.

The process of preparation is also defined. The said developer is useful in copying, making proofs, including digital color proofs, lithographic printing plates, and resists.

61 Claims, No Drawings

LIQUID ELECTROSTATIC DEVELOPER CONTAINING MULTIBLOCK POLYMERS

DESCRIPTION

TECHNICAL FIELD

This invention relates to a liquid electrostatic developer having improved properties. More particularly this invention relates to a liquid electrostatic developer containing particles containing an admixture of a multiblock copolymer and a thermoplastic resin.

BACKGROUND ART

It is known that a latent electrostatic image can be developed with toner particles dispersed in an insulating nonpolar liquid. Such dispersed materials are known as liquid toners or liquid developers. A latent electrostatic image may be produced by providing a photoconductive layer with a uniform electrostatic charge and subsequently discharging the electrostatic charge by exposing it to a modulated beam of radiant energy. Other methods are known for forming latent electrostatic images. Useful liquid developers comprise a thermoplastic resin, dispersant nonpolar liquid, and charge director. Generally a suitable colorant is present such as a pigment or dye. The colored toner particles are dispersed in the nonpolar liquid which generally has a high-volume resistivity in excess of $10^9$ ohm centimeters, a low dielectric constant below 3.0 and a high vapor pressure. The toner particles are less than 10 $\mu$m average by area size. After the latent electrostatic image has been formed, the image is developed by the colored toner particles dispersed in said dispersant nonpolar liquid and the image may be used directly or subsequently be transferred to a carrier sheet.

A problem with liquid developers of the past is that they have a grainy appearance, i.e., have nonuniform resolution. Graininess causes unclear images, and reduces the number of gray levels that can be discerned in the images obtained. Another problem is incomplete toning and "toner robbing" where dark-toned image areas deplete toner from light-toned image areas. These phenomena are caused by low toner mobility, i.e., the toner does not travel to the oppositively charged film fast enough to tone to completion.

It has been found that the above disadvantages can be overcome and improved liquid electrostatic developers prepared containing a dispersant nonpolar liquid, charge director and thermoplastic resin particles of an admixture of a multiblock copolymer and a thermoplastic resin.

SUMMARY OF THE INVENTION

In accordance with this invention there is provided a liquid electrostatic developer consisting essentially of (A) nonpolar liquid having a Kauri-butanol value of less than 30, present in a major amount, (B) thermoplastic resin particles having an average by area particle size of less than 10 $\mu$m consisting essentially of a mixture of (1) 80 to 95% by weight of a thermoplastic resin and (2) 20 t 5% by weight of a multiblock copolymer compound of the general formula:

X-Y-(Z)n wherein

X is a polymerized vinyl aromatic
Y is a polymerized diene, and
Z is a polymerized vinyl aromatic when n is 1 and a block copolymer of a polymerized vinyl aromatic and a polymerized diene when n is 2 to 10, the weight percentages based on the total weight of resin particles, and (C) a charge director compound.

In accordance with an embodiment of this invention there is provided a process for preparing liquid electrostatic developer for electrostatic image comprising A. dispersing at an elevated temperature in a vessel (1) 80 to 95% by weight of a thermoplastic resin and (2) a multiblock copolymer compound of the general formula:

X-Y-(Z)n where

X is a polymerized vinyl aromatic, Y is a polymerized diene, and Z is a polymerized vinyl aromatic when n is 1, and a block copolymer of a polymerized vinyl aromatic and a polymerized diene when n is 2 to 10, the weight percentages based on the total weight of components (1) and (2), and (3) a nonpolar liquid having a Kauributanol value of less than 30, while maintaining the temperature in the vessel at a temperature sufficient to plasticize components (1) and (2) and below that at which the dispersant nonpolar liquid degrades and components (1) and (2) decompose, B. cooling the dispersion, either
  (1) without stirring to form a gel or solid mass, followed by shredding the gel or solid mass and grinding by means of particulate media with or without the presence of additional liquid;
  (2) with stirring to form a viscous mixture and grinding by means of particulate media with or without the presence of additional liquid; or
  (3) while grinding by means of particulate media to prevent the formation of a gel or solid mass with or without the presence of additional liquid; and C. separating the dispersion of toner particles having an average by area particle size of less than 10 $\mu$m from the particulate media, and D. adding to the dispersion during or subsequent to Step A a nonpolar liquid soluble charge director compound.

DETAILED DESCRIPTION OF THE INVENTION

Throughout the specification the below-listed terms have the following meanings:

In the claims appended hereto "consisting essentially of" means the composition of the electrostatic liquid developer does not exclude unspecified components which do not prevent the advantages of the developer from being realized. For example, in addition to the primary components, there can be present additional components, such as a colorant, fine particle size oxides, adjuvant, e.g., polyhydroxy compound, aminoalcohol, polybutylene succinimide, aromatic hydrocarbon, metallic soap, inorganic metal salt, etc.

Charge director means a compound or material that imparts a charge, i.e., positive or negative, to the liquid electrostatic developer.

Additional liquid means dispersant nonpolar liquid, polar liquid, or combinations thereof.

Metallic soap means a compound wherein the cationic component is a mono- or polyvalent metal component and an acid portion provided by a saturated or unsaturated carboxylic acid of 1 to 100 carbon atoms, preferably 5 to 35 carbon atoms.

Inorganic metal salt means a compound wherein the cationic component of the salt is selected from the group consisting of the metals of the Groups Ia, IIa and IIIa of the periodic table of elements, and wherein the anionic component of the salt, for example, is selected from the group consisting of halogen, carbonate, acetate, sulfate, borate, nitrate, and phosphate.

The dispersant nonpolar liquids (A) are, preferably, branched-chain aliphatic hydrocarbons and more particularly, Isopar®-G, Isopar®-H, Isopar®-K, Isopar®-L, Isopar®-M and Isopar®-V. These hydrocarbon liquids are narrow cuts of isoparaffinic hydrocarbon fractions with extremely high levels of purity. For example, the boiling range of Isopar®-G is between 157° C. and 176° C., Isopar®-H between 176° C. and 191° C., Isopar®-K between 177° C. and 197° C., Isopar®-L between 188° C. and 206° C. and Isopar®-M between 207° C. and 254° C. and Isopar®-V between 254.5° C. and 329.4° C. Isopar®-L has a mid-boiling point of approximately 194° C. Isopar®-M has a flash point of 80° C. and an auto-ignition temperature of 338° C. Stringent manufacturing specifications, such as sulphur, acids, carboxyl, and chlorides are limited to a few parts per million. They are substantially odorless, possessing only very mild paraffinic odor. They have excellent odor stability and are all manufactured by the Exxon Corporation. High-purity normal paraffinic liquids, Norpar®12, Norpar®13 and Norpar®15, Exxon Corporation, may be used. These hydrocarbon liquids have the following flash points and auto-ignition temperatures:

| Liquid | Flash Point (°C.) | Auto-Ignition Temp (°C.) |
|---|---|---|
| Norpar® 12 | 69 | 204 |
| Norpar® 13 | 93 | 210 |
| Norpar® 15 | 118 | 210 |

All of the dispersant nonpolar liquids have an electrical volume resistivity in excess of $10^9$ ohm centimeters and a dielectric constant below 3.0. The vapor pressures at 25° C. are less than 10 Torr. Isopar®-G has a flash point, determined by the tag closed cup method, of 40° C., Isopar®-H has a flash point of 53° C. determined by ASTM D 56. Isopar®-L and Isopar®-M have flash points of 61° C., and 80° C., respectively, determined by the same method. While these are the preferred dispersant nonpolar liquids, the essential characteristics of all suitable dispersant nonpolar liquids are the electrical volume resistivity and the dielectric constant. In addition, a feature of the dispersant nonpolar liquids is a low Kauri-butanol value less than 30, preferably in the vicinity of 27 or 28, determined by ASTM D 1133. The ratio of thermoplastic resin to dispersant nonpolar liquid is such that the combination of ingredients becomes fluid at the working temperature. The nonpolar liquid is present in an amount of 85 to 99.98% by weight, preferably 95 to 99.9% by weight, based on the total weight of liquid developer. The total weight of solids in the liquid developer is 0.02 to 15%, preferably 0.1 to 5.0% by weight. The total weight of solids in the liquid developer is based on the thermoplastic resin and multiblock copolymer as defined, including components dispersed therein, and any pigment component present.

Useful thermoplastic resins or polymers present in the developer with the multiblock copolymer component include: ethylene vinyl acetate (EVA) copolymers (Elvax® resins, E. I. du Pont de Nemours and Company, Wilmington, DE), copolymers of ethylene and an $\alpha,\beta$-ethylenically unsaturated acid selected from the group consisting of acrylic acid and methacrylic acid, copolymers of ethylene (80 to 99.9%)/acrylic or methacrylic acid (20 to 0%)/alkyl (C1 to C5) ester of methacrylic or acrylic acid (0 to 20%), polyethylene, polystyrene, isotactic polypropylene (crystalline), ethylene ethyl acrylate series sold under the trademark Bakelite® DPD 6169, DPDA 6182 Natural and DTDA 9169 Natural by Union Carbide Corp., Stamford, CT; ethylene vinyl acetate resins, e.g., DQDA 6479 Natural and DQDA 6832 Natural 7 also sold by Union Carbide Corp.; Surlyn® ionomer resin by E. I. du Pont de Nemours and Company, Wilmington, DE, etc., or blends thereof, polyesters, polyvinyl toluene, polyamides, styrene polymers, e.g., styrene/butadiene random copolymers and epoxy resins. The synthesis of copolymers of ethylene and an $\alpha,\beta$-ethylenically unsaturated acid of either acrylic acid or methacrylic acid is described in Rees U.S. Pat. No. 3,264,272, the disclosure of which is incorporated herein by reference. For the purposes of preparing the preferred copolymers, the reaction of the acid containing copolymer with the ionizable metal compound, as described in the Rees patent, is omitted. The ethylene constituent is present in about 80 to 99.9% by weight of the copolymer and the acid component in about 20 to 0.1% by weight of the copolymer. The acid numbers of the copolymers range from 1 to 120, preferably 54 to 90. Acid No. is milligrams potassium hydroxide required to neutralize 1 gram of polymer. The melt index (g/10 min) of 10 to 500 is determined by ASTM D 1238 Procedure A. Preferred copolymers of this type have an acid number of 66 to 60 and a melt index of 100 and 500 determined at 190° C., respectively.

Preferred thermoplastic resins include acrylic resins, such as a copolymer of acrylic or methacrylic acid (optional but preferred) and at least one alkyl ester of acrylic or methacrylic acid wherein alkyl is 1-2-0 carbon atoms, e.g., methyl methacrylate (50–90%)/methacrylic acid (0–20%)/ethyl hexyl acrylate (10–50%); and other acrylic resins including Elvacite® acrylic resins, E. I. du Pont de Nemours and Company, Wilmington, DE or blends of resins, polystyrene; polyethylene; and modified resins disclosed in El-Sayed et al., U.S. Pat. No. 4,798,778, the disclosure of which is incorporated herein by reference.

In addition, the resins have the following preferred characteristics:
1. Be able to disperse the colorant, e.g., pigment; metallic soap, inorganic metal salt, etc.,
2. Be substantially insoluble in the nonpolar liquid at temperatures below 40° C., so that the resin will not dissolve or solvate in storage,
3. Be able to plasticize at temperatures above 50° C. to form a homogeneous mixture with solvent,
4. Be able to be ground to form particles between 0.1 μm and 5 μm, in diameter,
5. Be able to form a particle (average by area) of less than 10 μm, e.g., determined by Horiba CAPA-500 centrifugal automatic particle analyzer, manufactured by Horiba Instruments, Inc., Irvine, CA: solvent viscosity of 1.24 cps, solvent density of 0.76 g/cc, sample density of 1.32 using a centrifugal rotation of 1,000 rpm, a particle size range of 0.01 to less than 10 μm, and a particle size cut of 1.0 μm, 6. Be able to fuse at temperatures in excess of 100° C. By plasticizing in 3. above, the resins forming the toner particles will become swollen, gelatinous or softened.

Suitable multiblock copolymers containing three blocks to twelve blocks are represented by the following structure:

$$X-Y-(Z)_n$$

where X is a polymerized vinyl aromatic, Y is a polymerized diene, and Z is a polymerized vinyl aromatic when n is 1, and a block copolymer of a polymerized vinyl aromatic and a polymerized diene when n is 2 to 10.

n in the above formula is preferably 1 to 5 and most preferably 1. The ratio of the polymerized vinyl aromatic to the polymerized diene is 10/90 to 50/50, preferably 15/85 to 35/65, and most preferably 17/83. Useful polymerized vinyl aromatics are in the range of C8–C30, and are a vinyl substituted aryl ring constituent. The aryl ring may be further substituted. Examples of monomers used to prepare the polymerized vinyl aromatics include: styrene; alkyl (C1 to C30) substituted styrenes such as alphamethylstyrene, 4-methylstyrene, and 3-methylstyrene; vinylnaphthalene, isopropenylnaphthalene; chloro-, bromo-, and fluoro-styrene; alkoxystyrenes such as methoxystyrene; and nitrogen substituted styrenes, such as p-dimethylaminostyrene. Also included are polymerized vinyl-substituted heteroatomic aromatic compounds, C4–C30, where the heteroatom may be nitrogen or sulfur. Examples of useful monomers for polymer preparation include: 2-, 3-, and 4-vinyl pyridine, and substituted vinyl pyridines, such as 2-methyl-5-vinylpyridine, etc. Suitable polymerized dienes are of 4–6 carbon atoms. Useful polymerized dienes are prepared from butadiene, isoprene, dimethylbutadiene, ethyl butadiene, etc.

The ratio of the thermoplastic resin to the multiblock copolymer is 80/20 to 95/5, preferably 85/15 to 90/10, most preferably 90/10.

Suitable charge director compounds or materials (C), which impart charge to the particles are generally used in amount of 0.1 to 10,000 mg/g, preferably 1 to 500 mg/g developer solids, and include: positive charge directors, e.g., sodium dioctylsulfosuccinate (manufactured by American Cyanamid Co.), ionic charge directors such as zirconium octoate, copper oleate, iron naphthenate etc.; nonionic charge directors such as polyethylene glycol sorbitan stearate, as well as nigrosine and triphenylmethane type dyes; negative charge directors, e.g., lecithin, Basic Calcium Petronate®, Basic Barium Petronate® oil-soluble petroleum sulfonate, manufactured by Sonneborn Division of Witco Chemical Corp., New York, NY; alkyl succinimide manufactured by Chevron Chemical Company of California, etc. Also useful are glyceride type charge directors which may impart a positive or negative charge to the developer depending on the resin, pigment and/or adjuvant used. Suitable glyceride type charge directors are disclosed in Chan, El-Sayed, Trout and Thanawalla U.S. Application Serial No. 125,503 entitled "Glycerides as Charge Directors for Liquid Electrostatic Developers", filed Nov. 25, 1987, the disclosure of which is incorporated herein by reference.

As indicated above, an additional component that can be present in the electrostatic liquid developer is a colorant, such as a pigment or dye and combinations thereof, which is preferably present to render the latent image visible, although this need not be done in some applications. The colorant, e.g., a pigment, may be present in the amount of up to about 60 percent by weight based on the total weight of developer solids, preferably 0.01 to 30% by weight based on the total weight of developer solids. The amount of colorant may vary depending on the use of the developer. Examples of pigments are:

| PIGMENT LIST | | |
|---|---|---|
| Pigment Brand Name | Manufacturer | Color Index Pigment |
| Permanent Yellow DHG | Hoechst | Yellow 12 |
| Permanent Yellow GR | Hoechst | Yellow 13 |
| Permanent Yellow G | Hoechst | Yellow 14 |
| Permanent Yellow NCG-71 | Hoechst | Yellow 16 |
| Permanent Yellow GG | Hoechst | Yellow 17 |
| Hansa Yellow RA | Hoechst | Yellow 73 |
| Hansa Brilliant Yellow 5GX-02 | Hoechst | Yellow 74 |
| Dalamar ® Yellow YT-858-D | Heubach | Yellow 74 |
| Hansa Yellow X | Hoechst | Yellow 75 |
| Novoperm ® Yellow HR | Hoechst | Yellow 83 |
| Cromophtal ® Yellow 3G | Ciba-Geigy | Yellow 93 |
| Cromophtal ® Yellow GR | Ciba-Geigy | Yellow 95 |
| Novoperm ® Yellow FGL | Hoechst | Yellow 97 |
| Hansa Brilliant Yellow 10GX | Hoechst | Yellow 98 |
| Lumogen ® Light Yellow | BASF | Yellow 110 |
| Permanent Yellow G3R-01 | Hoechst | Yellow 114 |
| Cromophthal ® Yellow 8G | Ciba-Geigy | Yellow 128 |
| Irgazine ® Yellow 5GT | Ciba-Geigy | Yellow 129 |
| Hostaperm ® Yellow H4G | Hoechst | Yellow 151 |
| Hostaperm ® Yellow H3G | Hoechst | Yellow 154 |
| L74-1357 Yellow | Sun Chem. | Yellow 14 |
| L75-1331 Yellow | Sun Chem. | Yellow 17 |
| L75-2337 Yellow | Sun Chem. | Yellow 83 |
| Hostaperm ® Orange GR | Hoechst | Orange 43 |
| Paliogen ® Orange | BASF | Orange 51 |
| Irgalite ® Rubine 4BL | Ciba-Geigy | Red 57:1 |
| Quindo ® Magenta | Mobay | Red 122 |
| Indofast ® Brilliant Scarlet | Mobay | Red 123 |
| Hostaperm ® Scarlet GO | Hoechst | Red 168 |
| Permanent Rubine F6B | Hoechst | Red 184 |
| Monastral ® Magenta | Ciba-Geigy | Red 202 |
| Monastral ® Scarlet | Ciba-Geigy | Red 207 |
| Heliogen ® Blue L 6901F | BASF | Blue 15:2 |
| Heliogen ® Blue NBD 7010 | BASF | Blue 15:3 |
| Heliogen ® Blue K 7090 | BASF | Blue 15:3 |
| Heliogen ® Blue L 7101F | BASF | Blue 15:4 |
| Paliogen ® Blue L 6470 | BASF | Blue 60 |
| Heliogen ® Green K 8683 | BASF | Green 7 |
| Heliogen ® Green L 9140 | BASF | Green 36 |
| Monastral ® Violet R | Ciba-Geigy | Violet 19 |
| Monastral ® Red B | Ciba-Geigy | Violet 19 |
| Quindo ® Red R6700 | Mobay | Violet 19 |
| Quindo ® Red R6713 | Mobay | |
| Indofast ® Violet | Mobay | Violet 23 |
| Monastral ® Violet Maroon B | Ciba-Geigy | Violet 42 |
| Sterling ® NS Black | Cabot | Black 7 |
| Tipure ® R-101 | Du Pont | White 6 |
| Mogul L | Cabot | Black, CI 77266 |
| Uhlich ® BK 8200 | Paul Uhlich | Black (Blackness Index 155) |

Fine particle size oxides, e.g., silica, alumina, titania, etc.; preferably in the order of 0.5 μm or less can be dispersed into the liquefied resin. These oxides can be used alone or in combination with the colorants. Metal particles can also be added.

Another additional component of the electrostatic liquid developer is an adjuvant which, for example, includes polyhydroxy compound which contains at least 2 hydroxy groups, aminoalcohol, polybutylene succinimide, aromatic hydrocarbon having a Kauri of greater than 30, metallic soap, inorganic metal salt, etc. The adjuvants are generally used in an amount of 1 to 1000 mg/g, preferably 1 to 200 mg/g developer solids. Examples of the various above-described adjuvants include:

polyhydroxy compounds: ethylene glycol, 2,4,7,95-decyn-4,7-diol, poly(propylene glycol), pentaethylene glycol, tripropylene glycol, triethylene glycol, glycerol, pentaerythritol, glycerol-tri-l2 hydroxystearate, ethylene glycol monohydroxystearate, propylene glycol monohydroxy-stearate, etc.

aminoalcohol compounds: triisopropanolamine, triethanolamine, ethanolamine, 3-amino-l-propanol, o-aminophenol, 5-amino-l-pentanol, tetra(2-hydroxyethyl)ethylenediamine, etc.

polybutylene/succinimide: OLOA®-1200 sold by Chevron Corp., analysis information appears in Kosel U.S. Pat. No. 3,900,412, column 20, lines 5 to 13, the disclosure of which is incorporated herein by reference; Amoco 575 having a number average molecular weight of about 600 (vapor pressure osmometry) made by reacting maleic anhydride with polybutene to give an alkenylsuccinic anhydride which in turn is reacted with a polyamine. Amoco 575 is 40 to 45% surfactant, 36% aromatic hydrocarbon, and the remainder oil, etc.

aromatic hydrocarbon: benzene, toluene, naphthalene, substituted benzene and naphthalene compounds, e.g., trimethylbenzene, xylene, dimethylethylbenzene, ethylmethylbenzene, Aromatic 100 which is a mixture of C9 and C10 alkyl-substituted benzenes manufactured by Exxon Corp., etc.

metallic soap: aluminum tristearate; aluminum distearate; barium, calcium, lead and zinc stearates; cobalt, manganese, lead and zinc linoleates; aluminum, calcium, cobalt octoates; calcium and cobalt oleates; zinc palmitate; calcium, cobalt, manganese, lead and zinc naphthenates; calcium, cobalt, manganese, lead and zinc resinates; etc. The metallic soap is dispersed in the thermoplastic resin as described in Trout, U.S. Pat. No. 4,707,429, the disclosure of which is incorporated herein by reference.

inorganic metal salt: sodium chloride, sodium bromide, sodium acetate, potassium chloride, magnesium sulfate, calcium carbonate, cesium chloride, rubidium nitrate, beryllium sulfate, lithium bromide, rubidium acetate, strontium chloride, calcium acetate, aluminum sulfate, sodium borate, sodium phosphate, etc. The inorganic metal salt is dispersed in the thermoplastic resin as described in El-Sayed U.S. Pat. No. 4,758,494, the disclosure of which is incorporated hereby by reference.

The particles in the electrostatic liquid developer have an average by area particle size of less than 10 $\mu$m, preferably the average by area particle size is less than 5 $\mu$m. The resin particles of the developer may or may not be formed having a plurality of fibers integrally extending therefrom. The term "fibers" as used herein means pigmented toner particles formed with fibers, tendrils, tentacles, threadlets, fibrils, ligaments, hairs, bristles, or the like.

The electrostatic liquid developer can be prepared by a variety of processes. For example, into a suitable mixing or blending vessel, e.g., attritor, heated ball mill, heated vibratory mill such as a Sweco Mill manufactured by Sweco Co., Los Angeles, CA, equipped with particulate media, for dispersing and grinding, Ross double planetary mixer manufactured by Charles Ross and Son, Hauppauge, NY, etc., or a two roll heated mill (no particulate media necessary) are placed the thermoplastic resin, the multiblock copolymer, and dispersant polar liquid described above. Generally the thermoplastic resin, multiblock copolymer, dispersant nonpolar liquid and optional colorant are placed in the vessel prior to starting the dispersing step. Optionally the colorant can be added after homogenizing the resin, multiblock copolymer and the dispersant nonpolar liquid. Polar liquid can be present in the vessel, e.g., up to 100% based on the total weight of developer liquid. The dispersing step is generally accomplished at elevated temperature, i.e., the temperature of ingredients in the vessel being sufficient to plasticize and liquefy the thermoplastic resin and multiblock copolymer but being below that at which the nonpolar liquid or polar liquid, if present, degrades and the thermoplastic resin, multiblock copolymer and/or colorant, if present, decomposes. A preferred temperature range is 80 to 120° C. Other temperatures outside this range may be suitable, however, depending on the particular ingredients used. The presence of the irregularly moving particulate media in the vessel is preferred to prepare the dispersion of toner particles. Other stirring means can be used as well, however, to prepare dispersed toner particles of proper size, configuration and morphology. Useful particulate media are particulate materials, e.g., spherical, cylindrical, etc. selected from the group consisting of stainless steel, carbon steel, alumina, ceramic, zirconia, silica, and sillimanite. Carbon steel particulate media are particularly useful when colorants other than black are used. A typical diameter range for the particulate media is in the range of 0.04 to 0.5 inch (1.0 to ~13 mm).

After dispersing the ingredients in the vessel, with or without a polar liquid present until the desired dispersion is achieved, typically 1 to 3 hours with the mixture being fluid, the dispersion is cooled, e.g., in the range of 0° C. to 50° C. Cooling may be accomplished, for example, in the same vessel, such as the attritor, while simultaneously grinding with particulate media to prevent the formation of a gel or solid mass; without stirring to form a gel or solid mass, followed by shredding the gel or solid mass and grinding, e.g., by means of particulate media; or with stirring to form a viscous mixture and grinding by means of particulate media. Additional liquid ma be added at any step during the preparation of the liquid electrostatic developers to facilitate grinding or to dilute the developer to the appropriate % solids needed for toning. Cooling is accomplished by means known to those skilled in the art and is not limited to cooling by circulating cold water or a cooling material through an external cooling jacket adjacent the dispersing apparatus or permitting the dispersion to cool to ambient temperature. The resin precipitates out of the dispersant during the cooling. Toner particles of average particle size (by area) of less than 10 $\mu$m, as determined by a Horiba CAPA-500 centrifugal particle analyzer described above or other comparable apparatus, such as a Malvern 3600E Particle Sizer manufactured by Malvern, Southborough, MA with particle size correlation, are formed by grinding for a relatively short period of time.

After cooling and separating the dispersion of toner particles from the particulate media, if present, by means known to those skilled in the art, it is possible to reduce the concentration of the toner particles in the dispersion, impart and electrostatic charge of predetermined polarity to the toner particles, or a combination of these variations. The concentration of the toner particles in the dispersion may be reduced by the addition of additional dispersant nonpolar liquid during or subsequent to the cooling of the dispersion. The dilution is normally conducted to reduce the concentration of toner particles to between 0.02 to 15 percent by weight, preferably 0.1 to 5.0, and more preferably 0.1 to 2.0 weight percent with respect to the dispersant nonpolar liquid. One or more charge director compounds (C), of the type set out above, can be added to impart a positive or negative charge, as desired. The addition may occur at any time during the process, e.g., after the particulate media, if used, are removed and the desired concentration of toner particles is achieved. If a diluting dispersant nonpolar liquid is also added, the charge director can be added prior to, concurrently with, or subsequent thereto. If an adjuvant compound of a type described above has not been previously added in the preparation of the developer, it can be added prior to or subsequent to the developer being charged.

Another process embodiment for preparing the liquid electrostatic developer comprises (A) mixing in a vessel thermoplastic resin, multiblock copolymer as set out above, a colorant and/or adjuvant in the absence of a nonpolar liquid having a Kauri-butanol value of less than 30 to form a solid mass, (B) shredding the solid mass, (C) grinding the shredded solid mass by means of particulate media in the presence of a liquid selected from the group consisting of a polar liquid having a Kauri-butanol value of at least 30, a nonpolar liquid having a Kauri-butanol value of less than 30, and combinations thereof, to form a dispersion of toner particles in the liquid, (D) separating the particulate media from the dispersion of toner particles having an average by area particle size of less than 10 μm, (E) adding to the dispersion during or subsequent to step (C) a charge director. Preferably additional nonpolar liquid is added during at least one of steps (C) to (E) of this process. Polar liquid or combinations of polar liquid and nonpolar liquid can also be added.

INDUSTRIAL APPLICABILITY

The liquid electrostatic developers of this invention are useful in copying, particularly in making medical hard copies which have extremely sharp and clean images, no or substantially no graininess or flow and no or substantially no toner robbing when compared to images formed from prior liquid electrostatic developers. The liquid electrostatic developers are also useful in color proofing, e.g., a reproduction of an image using the standard colors: yellow, cyan, magenta and black; digital color proofing, lithographic printing plates, and resists.

EXAMPLES

The following examples illustrate but do not limit the invention wherein the percentages and parts are by weight.

Number average molecular weight can be determined by known osmometry techniques. Weight average molecular weight can be determined by gel permeation chromatography (GPC). Melt indices can be determined by ASTM D 1238. Acid No. is milligrams potassium hydroxide required to neutralize 1 gram of polymer.

Toner robbing is defined as the incomplete toning of a light image area that is located next to a dark image area.

The average particle sizes by area can be determined by a Horiba CAPA-500 centrifugal particle analyzer, manufactured by Horiba Instruments, Inc., Irvine, CA: solvent viscosity of 1.24 cps, solvent density of 0.76 g/cc, sample density of 1.32 using a centrifugal rotation of 1,000 rpm, a particle size range of 0.01 to less than 10 μm, and a particle size cut of 1.0 μm. Particle sizes listed in the Examples and controls are determined using the Horiba analyzer.

Unless otherwise noted, the conductivity of each of the toners of the invention was 27–29 pmhos/cm, and images were made in the examples by means of a photoconducting film, e.g., such as are described in Mattor U.S. Pat. No. 3,314,788 and Paulin et al. U.S. Pat. No. 4,248,952, the disclosures of which are incorporated herein by reference, and which has a base support, such as 0 007 (0.18 mm) polyethylene terephthalate, bearing two layers, the outer layer being an organic photoconductive layer, and the inner layer next to the support being an electrically conductive layer such as aluminum, a portion of the outer layer being removed along at least one edge thereof to define a strip of the conductive layer and on the exposed strip a conductive paint was placed so as to permit the conductive layer to be grounded. The photoconducting film used was passed over a 1000 V scorotron at 0.5 inch/second (1.27 cm/second), discharged selectively using a cathode ray tube, and toned or developed with the developer of the samples as described was accomplished, using a developerfilled gap between a 350 V development electrode and the charged film. The images were fused in an oven at 130° C. for 1 minute, or by passing through standard fusing rolls at 140° C. and at a rate of 0.5 inch/second.

The multiblock copolymers when containing at least three blocks used in the Examples, are generally referred to as triblock polymers. Provided in Table 1 below are data on some of the multiblock copolymers used in the Examples belows.

TABLE 1

| POLYMER | DIENE | VINYL AROMATIC/ DIENE POLYMERS | TENSILE STRENGTH | SHORE HARDNESS | TYPE |
|---|---|---|---|---|---|
| Kraton ® 1300 | B | 17/83 | 700 | 53 | TB |
| Kraton ® 1101 | B | 31/69 | 4600 | 71 | TB |
| Kraton ® 1102 | B | 28/72 | 4600 | 71 | TB |
| Kraton ® 1184 (Control) | B | 30/70 | 4000 | 75 | BR |
| Kraton ® 1111 | I | 21/79 | 2900 | 52 | TB |
| Kraton ® 1117 | I | 17/83 | 1200 | 32 | TB |

TABLE 1-continued

| POLYMER | DIENE | VINYL AROMATIC/ DIENE POLYMERS | TENSILE STRENGTH | SHORE HARDNESS | TYPE |
|---|---|---|---|---|---|
| Stereon ® 840A | B | 43/57 | 1300 | 85 | MB |

B is butadiene
TB is triblock
BR is branched
I is isoprene
MB is multiblock
Kraton ® is a manufactured by Shell Chemical Company, Houston, Texas.
Stereon ® is manufactured by Firestone Synthetic Rubber and Latex Company, Akron, Ohio.

Toners were rated on a scale of 1 to 5, where 1 is excellent, 2 is very good, 3 is good, 4 is poor, and 5 is extremely poor. The ratings representing overall image quality were based on image resolution, clarity, graininess, flow, and toner robbing. Toner ratings are provided in Table 2 below.

EXAMPLE 1

The following ingredients were placed in a Union Process 01 attritor, Union Process Company, Akron, Ohio:

| INGREDIENTS | AMOUNT (g) |
|---|---|
| Terpolymer of methyl methacrylate (67%) methacrylic acid (3%) and ethylhexyl acrylate (30%), weight average molecular weight of 172,000, acid no. of 13 | 31.5 |
| Triblock copolymer of styrene/butadiene/ styrene (s/b ratio = 17/83), Kraton ® 1300 | 3.5 |
| Uhlich ® BK 8200, laked Carbon Black, Paul Uhlich & Co., Inc. Hastings-On-Hudson, NY | 9.0 |
| Isopar ®-L, nonpolar liquid having a Kauri-butanol value of 27, Exxon Corporation | 200.0 |

The ingredients were heated to 100° C. +/−10° C. in the attritor and milled with 0.1875 inch (4.76 mm) diameter stainless steel balls for one hour. The attritor was cooled to room temperature and milling was continued for 5 hours to obtain toner particles with an average particle size by area of 0.6 μm. The particulate media were removed and the dispersion of toner particles was then diluted to 1 percent solids with additional Isopar ®-L.

To 1.5 kg of this dispersion were added 100 grams of a 20% solution in Isopar ®-L of a 6% solution of iron naphthenate in mineral spirits, Polysciences, Inc., Warrington, PA to impart a positive charge to the developer. Image quality was outstanding, with extremely sharp and clean images, no graininess or flow, and no toner robbing.

EXAMPLE 2

Toner samples were prepared by the procedure described in Example 1 with the following exception: Each sample contained one of the following charge directors instead of iron naphthenate: manganese octoate, calcium naphthenate, Nuxtra ® Calcium, Nuxtra ® Iron, and Nuxtra ® Manganese. Nuxtra ® is a registered trademark of Huls America, Inc., Piscataway, NJ, for its metal alkanoates in solution (metal soaps in hydrocarbon solvents). Toners containing these charge directors gave images having image quality comparable to that obtained in Example 1.

EXAMPLE 3

The procedure of Example 1 was repeated with the following exceptions: the amounts of acrylic resin and triblock copolymer were 33.6 g and 1.4 g, respectively. The dispersion was cold ground for 10 hours instead of 5 hours resulting in an average particle size by area of 0.9 μm. Image quality was very good, with only slight graininess, and a little toner robbing.

EXAMPLE 4

Example 1 was repeated with the following exceptions: 1.7 grams of Quindo ® Red R-6700, and 9.7 grams of Quindo ® Red R-6713 (Mobay Chemical Co., Union, NJ) were used instead of 9 grams of Uhlich ® BK8200 black pigment. A copolymer of ethylene (89%) and methacrylic acid (11%), melt index at 190° C. is 100, acid no. is 66, was used instead of the acrylic terpolymer. The dispersion was cold ground for 20 hours resulting in an average particle size by area of 1.8 μm. Image quality was outstanding, with little to no graininess, and little toner robbing.

EXAMPLE 5

The following ingredients were placed in a Union Process 01 attritor, Union Process Company, Akron, Ohio:

| INGREDIENTS | AMOUNT (g) |
|---|---|
| Copolymer of ethylene (89%)/ methacrylic acid (11%), melt index at 190° C. is 100, acid no. of 66 | 27.2 |
| Triblock copolymer described in Example 1 | 4.0 |
| Heliogen ® Blue NBD 70, BASF Corp., Parsippany, N.J. | 8.0 |
| Aluminum stearate, | 0.8 |
| Isopar ®-L, nonpolar liquid having a Kauri-butanol value of 27, Exxon Corporation | 200.0 |

The ingredients were heated to 100° C. +/−10° C. in the attritor and milled with 0.1875 inch (4.76 mm) diameter stainless steel balls for two hours. The attritor was cooled to room temperature and milling was continued for 46 hours to obtain toner particles with an average particle size by area of 0.6 μm. The particulate media were removed and the dispersion of toner particles was then diluted to 1.5 percent solids with additional Isopar ®-L and charged with Basic Barium Petronate ® (40 mg Basic Barium Petronate ®/g of developer solids) resulting in a conductivity of 15 pmhos/cm. Image quality was determined using a Savin 870 copier at standard mode: charging corona set at 6.8 kV and transfer corona set at 8.0 kV using carrier sheets such as Du Pont Premium Xerographic Bond, long grain, Sub 20. Image quality was excellent, with 10 lp/mm resolution and density of 0.9.

EXAMPLE 6

The procedure of Example 1 was repeated with the following exceptions: no pigment was used, the ingredients were milled for 2 hours at 100° C. and cold ground for 23 hours resulting in an average particle size by area of 0.7 μm. Images were excellent and exceptionally sharp.

EXAMPLE 7

The procedure of Example 1 was repeated with the following exceptions: 33.25 g of the acrylic terpolymer were used instead of 31.5 g, and 1.75 g of the styrene/butadiene/styrene triblock copolymer with a 28/72 S/B ratio, Kraton®1102, were used instead of 3.5 g of the copolymer in Example 1. The dispersion was cold ground for 14 hours resulting in an average particle size by area of 0.8 μm. Images from this toner were good, with high resolution and little graininess.

EXAMPLE 8

The procedure of Example 7 was repeated with the following exceptions: The ratio of S/B in the triblock polymer used was 31/69 (Kraton®1101). The toner was cold ground for 11 hours resulting in an average particle size by area of 0.9 μm. Images from this toner were good, with good resolution, little graininess, and a small amount of toner robbing.

EXAMPLE 9

The procedure of Example 1 was repeated with the following exceptions: A styrene/isoprene/styrene triblock having a styrene to isoprene ratio of 17/83 was used (Kraton®1117) instead of the triblock copolymer used in Example 1. The ingredients were milled at 100° C. for 2 hours and cold ground for 33 hours resulting in an average particle size by area of 0.6 μm. Image quality was excellent, with extremely sharp images, no toner robbing, no flow, and no graininess.

EXAMPLE 10

The procedure of Example 9 was repeated with the following exceptions: 33.25 g of the acrylic terpolymer and 1.75 grams of the triblock copolymer were used. The ingredients wer milled at 100° C. for 1 hour followed by a 25 hour cold grind resulting in toner particles having an average particle size by area of 1.11 μm. Image quality was very good, with extremely sharp images, no flow, and a small amount of graininess and toner robbing.

EXAMPLE 11

The procedure of Example 9 was repeated with the following exceptions: The styrene/isoprene/styrene triblock copolymer used had a styrene to isoprene ratio of 21/79 (Kraton®1111). The dispersion was cold ground for 6 hours resulting in an average particle size by area of 0.5 μm. Image quality was very good, with sharp images, no flow, no graininess and a small amount of toner robbing.

EXAMPLE 12

The procedure of Example 10 was repeated with the following exceptions: The styrene/isoprene/styrene triblock copolymer described in Example 11 was used. The dispersion was cold ground for 15 hours resulting in an average particle size by area of 1.17 μm. Image quality was good, with some graininess, good resolution, no flow, and some toner robbing.

EXAMPLE 13

The procedure of Example 1 was repeated with the following exceptions: A styrene/butadiene random copolymer having a styrene to butadiene ratio of 85/15 was used instead of the acrylic terpolymer. The dispersion was cold ground for 25 hours resulting in an average particle size by area of 0.9 μm. Image quality was very good, with extremely sharp images, no graininess, and a little flow and toner robbing.

EXAMPLE 14

The procedure of Example 1 was repeated with the following exceptions: a polyethylene resin was used instead of the acrylic terpolymer, and Heliogen® Blue NB D 7010 (BASF Corp., Parsippany, NJ) was used instead of the black pigment. The toner was cold ground for 20 hours resulting in an average particle size by area of 0.7 μm. Image quality was outstanding, with little to no graininess, exceptional resolution, and little toner robbing.

EXAMPLE 15

The procedure of Example 5 was repeated with the following exceptions: 9 g of Diarylide® Yellow AAOT yellow pigment (Sun Chemical Corp., Cincinnati, Ohio) were used instead of the Heliogen® Blue NBD 7010 pigment, and a styrene/isoprene/styrene triblock copolymer having a ratio of styrene to isoprene of 17 to 83 was used. The ingredients were milled at 100° C. for 1 hour and cold ground for 20 hours resulting in an average particle size by area of 0.7 μm. 1.8 grams of 5% solution of lecithin in Isopar®-L were used instead of Basic Barium Petronate® resulting in a toner having a conductivity of 15 pmhos/cm. The paper used was Plainwell Offset Enamel, 3 class, 60 lb. test, Plainwell Paper Co., Plainwell, MI. Images were extremely sharp with a destiny of 0.69 and a 4.4 lp/mm resolution.

EXAMPLE 16

The procedure of Example 1 was repeated with the following exceptions: 1.75 g of a styrene/butadiene multiblock copolymer with a S/B ratio of 43/57 (Stereon®840A polymer, Firestone), were used instead of the triblock copolymer. 33.25 g of the acrylic terpolymer were used instead of 31.5 g. The dispersion was cold ground for 18 hours resulting in an average particle size by area of 10.8. Image quality was good, with some graininess and toner robbing.

EXAMPLE 17

The procedure of Example 1 was repeated with the following exceptions: 28 g of the acrylic terpolymer and 7 g of the triblock copolymer were used. The ingredients were milled at 100° C. for 1.5 hours and cold ground for 13.5 hours resulting in a toner having an average particle size by area of 0.5 μm. Image quality was excellent, with extremely sharp images, no graininess, and no toner rubbing.

CONTROL 1

The procedure of Example 1 was repeated with the following exceptions: 35 g of the acrylic terpolymer and 0 g of the triblock copolymer were used. The dispersion was cold ground for 33 hours resulting in a toner having an average particle size by area of 1.3 μm. Image quality was extremely poor, with considerable graininess, poor resolution and much toner robbing.

CONTROL 2

The procedure of Example 1 was repeated with the following exceptions: 3.5 g of polystyrene (weight average molecular weight=250,000) were used instead of the triblock copolymer. The ingredients were milled at 100° C. for 1 hour, cold ground for 2.5 hours, milled at 100° C. for 2 hours followed by cold grinding for 14 hours resulting in a toner having an average particle size by area of 1.7 μm. Images made from this toner showed extreme graininess, toner robbing, poor resolution, and severe flow.

CONTROL 3

The procedure of Example 1 was repeated with the following exceptions: polybutadiene (number average molecular weight=4500) was used instead of the triblock copolymer. The ingredients were milled at 100° C. for 1.5 hours and cold ground for 17 hours resulting in an average particle size by area of 0.8 μm. Images from this toner were extremely poor, and very grainy, exhibited toner robbing, had poor resolution and severe flow.

CONTROL 4

The procedure of Example 1 was repeated with the following exceptions: 0.7 g of polystyrene and 2.8 g of butadiene were used instead of the styrene/butadiene/styrene triblock copolymer. These are the same percentages of styrene and butadiene in the triblock used in Example 1. The weight average molecular weight of the styrene was 250,000 and the number average molecular weight of the butadiene was 4500. The ingredients were milled at 100° C. for 2 hours and cold ground for 9 hours resulting in an average particle size by area of 1.5 μm. Images from this toner were extremely poor, very grainy, and showed toner robbing, and had poor resolution.

CONTROL 5

The procedure of Example 1 was repeated with the following exception: the resin used was 100% polystyrene (weight average molecular weight=250,000), instead of a mixture of acrylic terpolymer and triblock copolymer. This toner turned to a hard, rock-like mixture in the attritor, and was discarded.

CONTROL 6

The procedure of Example 1 was repeated with the following exception: the resin used was 100% polybutadiene (number average molecular weight=4500) instead of the mixture of acrylic terpolymer and triblock copolymer. This toner turned to a large rubbery block in the attritor, and was discarded.

CONTROL 7

The procedure of Example 1 was repeated with the following exception: instead of 3.5 g of the styrene/butadiene/styrene triblock copolymer with a 17/83 S/B ratio, 3.5 g of a styrene/butadiene random copolymer having 28/72 S/B ratio were added. During the attritor grind, the mixture became too hard to be used as a toner, and was discarded.

CONTROL 8

The procedure of Example 1 was repeated with the following exception: instead of 3.5 g. of the styrene/butadiene/styrene triblock copolymer with a 17/83 S/B ratio, 3.5 g of a styrene/butadiene random copolymer having 31/69 S/B ratio were added. During the attritor grind, the mixture became too hard to be used as a toner, and was discarded.

CONTROL 9

The procedure of Example 1 was repeated with the following exception: the resins used were 28 g of the styrene/butadiene/styrene triblock copolymer (80% of the total resin), and 7 g of the acrylic terpolymer (20% of the total resin). During grinding, the mixture became one cohesive rubbery mass, and was discarded.

CONTROL 10

The procedure of Example 1 was repeated with the following exceptions: instead of the styrene/butadiene/styrene triblock copolymer, a random styrene/butadiene (85% styrene, 15% butadiene) polymer was used. The dispersion was cold ground for 19.5 hours resulting in an average particle size by area of 1.3 μm. Images from this toner were poor, with considerable graininess, poor resolution, and considerable toner robbing.

CONTROL 11

The procedure in Example 7 was repeated with the following exception: instead of the triblock copolymer, a styrene/butadiene diblock copolymer (weight ratio S/B=30/70) was used. The dispersion was cold ground for 20 hours resulting in a average particle size by area of 1.3 μm. Image quality was poor, very grainy, showed toner robbing, and had poor resolution.

CONTROL 12

The procedure in Example 1 was repeated with the following exceptions: instead of the triblock copolymer, a styrene/butadiene branched graft polymer (weight ratio S/B=30/70) was used. Instead of 31.5 g of the acrylic terpolymer, 33.25 g were used, and instead of 3.5 g. of the triblock copolymer, 1.75 g of the graft polymer were added. The ingredients were milled at 100° C. for 1.5 hours and cold ground for 26 hours resulting in an average particle size by area of 1.7 μm. Image quality was poor, very grainy, showed toner robbing, and had poor resolution.

CONTROL 13

The procedure of Example 1 was repeated with the following exceptions: instead of the styrene/butadiene/styrene triblock copolymer with a S/B ratio of 17/83, a random styrene/butadiene copolymer was used, with a S/B ratio of 23/77. The ingredients were cold ground for 25 hours resulting in an average particle size by area of 1.2 μm. Image quality was poor, with poor resolution, considerable graininess, and much toner robbing.

Toners for Examples 1 and 3 to 17 and Controls 1 to 13 are rated in Table 2 below:

TABLE 2

| EXAMPLES | | CONTROLS | |
|---|---|---|---|
| TONER | RATING | TONER | RATING |
| E1 | 1 | C1 | 5 |

TABLE 2-continued

| EXAMPLES | | CONTROLS | |
|---|---|---|---|
| TONER | RATING | TONER | RATING |
| E3 | 2 | C2 | 5 |
| E4 | 1 | C3 | 5 |
| E5 | 1 | C4 | 5 |
| E6 | 1 | C5 | N/A |
| E7 | 3 | C6 | N/A |
| E8 | 3 | C7 | N/A |
| E9 | 1 | C8 | N/A |
| E10 | 2 | C9 | N/A |
| E11 | 2 | C10 | 4 |
| E12 | 3 | C11 | 4 |
| E13 | 2 | C12 | 4 |
| E14 | 1 | C13 | 4 |
| E15 | 1 | | |
| E16 | 3 | | |
| E17 | 1 | | |

What is claimed is:

1. A liquid electrostatic developer consisting essentially of
 A. nonpolar liquid having a Kauri-butanol value of less than 30, present in a major amount,
 B. thermoplastic resin particles having an average by area particle size of less than 10 μm consisting essentially of a mixture of (1) 80 to 95% by weight of a thermoplastic resin and (2) 20 to 5% by weight of a multiblock copolymer compound of the general formula:

X-Y-(Z)n wherein
 X is a polymerized vinyl aromatic
 Y is a polymerized diene, and
 Z is a polymerized vinyl aromatic when n is 1 and a block copolymer of a polymerized vinyl aromatic and a polymerized diene when n is 2 to 10, the weight percentages based on the total weight of resin particles, and
 C. a charge director compound.

2. An electrostatic liquid developer according to claim 1 wherein n in the formula is 1 to 5.

3. An electrostatic liquid developer according to claim 1 wherein n in the formula is 1.

4. An electrostatic liquid developer according to claim 1 wherein the ratio of polymerized vinyl aromatic component to diene polymer of the multiblock copolymer compound is 10/90 to 50/50.

5. An electrostatic liquid developer according to claim 1 wherein the thermoplastic resin component is a copolymer of acrylic or methacrylic acid and at least one alkyl ester of acrylic or methacrylic acid wherein alkyl is 1 to 20 carbon atoms.

6. An electrostatic liquid developer according to claim 5 wherein the thermoplastic resin component is a copolymer of methyl methacrylate (50–90%)/methacrylic acid (0–20%)/ethyl hexyl acrylate (10–50%).

7. An electrostatic liquid developer according to claim 6 wherein the thermoplastic resin component is a copolymer of methyl methacrylate (67%)/methacrylic acid (3%)/ethyl hexyl acrylate (30%).

8. An electrostatic liquid developer according to claim 1 wherein the thermoplastic resin component is a styrene/butadiene random copolymer.

9. An electrostatic liquid developer according to claim 1 wherein the thermoplastic resin component is polyethylene.

10. An electrostatic liquid developer according to claim 5 wherein the multiblock copolymer component is a styrene/butadiene/styrene triblock copolymer.

11. An electrostatic liquid developer according to claim 6 wherein the multiblock copolymer is a styrene/butadiene/styrene triblock copolymer.

12. An electrostatic liquid developer according to claim 8 wherein the multiblock copolymer is a styrene/butadiene/styrene triblock copolymer.

13. An electrostatic liquid developer according to claim 9 wherein the multiblock copolymer is a styrene/butadiene/styrene triblock copolymer.

14. An electrostatic liquid developer according to claim 5 wherein the multiblock copolymer component is a styrene/isoprene/styrene triblock copolymer 15. An electrostatic liquid developer according to claim 6 wherein the multiblock copolymer component is a styrene/isoprene/styrene triblock copolymer.

16. An electrostatic liquid developer according to claim 5 wherein the multiblock copolymer is styrene/butadiene/(styrene/butadiene)n wherein n is 1–10.

17. An electrostatic liquid developer according to claim 1 containing up to about 60% by weight of a colorant based on the total weight of developer solids.

18. An electrostatic liquid developer according to claim 17 wherein the colorant is a pigment.

19. An electrostatic liquid developer according to claim 1 wherein a fine particle size oxide is present.

20. An electrostatic liquid developer according to claim 1 wherein an additional compound is present which is an adjuvant selected from the group consisting of polyhydroxy compound, aminoalcohol, polybutylene succinimide, aromatic hydrocarbon, metallic soap and inorganic metal salt, the metallic soap and inorganic metal salt being dispersed in the resin particles.

21. An electrostatic liquid developer according to claim 20 wherein the resin particles have dispersed therein a metallic soap adjuvant.

22. An electrostatic liquid developer according to claim 17 wherein the thermoplastic resin component is a copolymer of acrylic acid or methacrylic acid and at least one alkyl ester of acrylic or methacrylic acid wherein alkyl is 1 to 20 carbon atoms.

23. An electrostatic liquid developer according to claim 22 wherein the thermoplastic resin component is a copolymer of methyl methacrylate (50–90%)/methacrylic acid (0–20%)/ethyl hexyl acrylate (10–50%).

24. An electrostatic liquid developer according to claim 23 wherein the multiblock copolymer is a styrene/butadiene/styrene triblock copolymer.

25. An electrostatic liquid developer according to claim 23 wherein the multiblock copolymer is a styrene/isoprene/styrene triblock copolymer.

26. An electrostatic liquid developer according to claim 1 wherein the resin particles have an average by area particle size of less than 5 μm.

27. An electrostatic liquid developer according to claim 1 wherein the charge director is lecithin.

28. An electrostatic liquid developer according to claim 1 wherein the charge director is an oilsoluble petroleum sulfonate.

29. An electrostatic liquid developer according to claim 1 wherein the charge director is a compound selected from the group consisting of iron naphthenate, manganese octoate, calcium naphthenate, calcium alkanoate, iron alkanoate and manganese alkanoate.

30. Process for preparing liquid electrostatic developer for electrostatic imaging comprising (A) dispersing at an elevated temperature in a vessel (1) 80 to 95% by weight of a thermoplastic resin and (2) 20 to 5% by weight of a multiblock copolymer compound of the general formula:

X-Y-(Z)n wherein
X is a polymerized vinyl aromatic
Y is a polymerized diene, and
Z is a polymerized vinyl aromatic when n is 1 and a block copolymer of a polymerized vinyl aromatic and a polymerized diene when n is 2 to 10, the weight percentages based on the total weight of components (1) and (2), and (3) a nonpolar liquid having a Kauri-butanol value of less than 30, while maintaining the temperature in the vessel at a temperature sufficient to plasticize components (1) and (2) and below that at which the nonpolar liquid degrades and components (1) and (2) decompose,
(B) cooling the dispersion, either
 (1) without stirring to form a gel or solid mass, followed by shredding the gel or solid mass and grinding by means of particulate media with or without the presence of additional liquid;
 (2) with stirring to form a viscous mixture and grinding by means of particulate media with or without the presence of additional liquid; or
 (3) while grinding by means of particulate media to prevent the formation of a gel or solid mass with or without the presence of additional liquid; and
C. separating the dispersion of toner particles having an average by area particle size of less than 10 μm from the particulate media, and
D. adding to the dispersion during or subsequent to Step A a nonpolar liquid soluble charge director compound.

31. A process according to claim 30 wherein n in the formula is 1 to 5.

32. A process according to claim 30 wherein n in the formula is 1.

33. A process according to claim 30 wherein the ratio of polymerized vinyl aromatic component to diene polymer of the multiblock copolymer compound is 10/90 to 50/50.

34. A process according to claim 30 wherein the thermoplastic resin component is a copolymer of acrylic or methacrylic acid and at least one alkyl ester of acrylic or methacrylic acid wherein alkyl is 1 to 20 carbon atoms.

35. A process according to claim 34 wherein the thermoplastic resin component is a copolymer of methyl methacrylate (50–90%)/methacrylic acid (0–20%) ethyl hexyl acrylate (10–50%).

36. A process according to claim 35 wherein the thermoplastic resin component is a copolymer of methyl methacrylate (67%)/methacrylic acid (3%)/ethyl hexyl acrylate (30%).

37. A process according to claim 30 wherein the thermoplastic resin component is a styrene/butadiene random copolymer.

38. A process according to claim 30 wherein the thermoplastic resin component is polyethylene.

39. A process according to claim 34 wherein the multiblock copolymer component is a styrene/butadiene/styrene triblock copolymers 40. A process according to claim 35 wherein the multiblock copolymer is a styrene/butadiene/styrene triblock copolymer.

41. A process according to claim 37 wherein the multiblock copolymer is a styrene/butadiene/styrene triblock copolymer.

42. A process according to claim 38 wherein the multiblock copolymer is a styrene/butadiene/styrene triblock copolymer.

43. A process according to claim 34 wherein the multiblock copolymer component is a styrene/isoprene/styrene triblock copolymer.

44. A process according to claim 35 wherein the multiblock copolymer component is a styrene/isoprene/styrene triblock copolymer.

45. A process according to claim 34 wherein the multiblock copolymer is styrene/butadiene/(styrene/butadiene)n wherein n is 1 to 10.

46. A process according to claim 30 wherein there is present in the vessel up to 100% by weight of a polar liquid having a Kauri-butanol value of at least 30, the percentage based on the total weight of developer liquid.

47. A process according to claim 30 wherein the charge director is lecithin.

48. A process according to claim 30 wherein the charge director is an oil-soluble petroleum sulfonate.

49. A process according to claim 30 wherein the charge director is a compound selected from the group consisting of iron naphthenate, manganese octoate, calcium naphthenate, calcium alkanoate, iron alkanoate and manganese alkanoate.

50. A process according to claim 30 wherein the concentration of toner particles is reduced to between 0.02 to 15% by weight with respect to the liquid by adding additional nonpolar liquid, polar liquid, or combinations thereof.

51. A process according to claim 50 wherein the concentration of toner particles is reduced by additional nonpolar liquid.

52. A process according to claim 30 wherein cooling the dispersion is accomplished while grinding by means of particulate media to prevent the formation of a gel or solid mass with or without the presence of additional liquid.

53. A process according to claim 30 wherein cooling the dispersion is accomplished without stirring to form a gel or solid mass, followed by shredding the gel or solid mass and grinding by means of particulate media with or without the presence of additional liquid.

54. A process according to claim 30 wherein cooling the dispersion is accomplished with stirring to form a viscous mixture and grinding by means of particulate media with or without the presence of additional liquid.

55. A process according to claim 30 wherein during dispersing step (A) is added an adjuvant compound selected from the group consisting of polyhydroxy compound, aminoalochol, polybutylene succinimide, aromatic hydrocarbon, metallic soap and inorganic metal salt, the metallic soap and inorganic metal salt being dispersed in the resin particles.

56. A process according to claim 55 wherein the adjuvant compound is a metallic soap.

57. A process for preparing electrostatic liquid developer for electrostatic imaging comprising
(A) mixing in a vessel (1) a thermoplastic resin and (2) multiblock copolymer of the general formula:

X-Y-(Z)n wherein
X is a polymerized vinyl aromatic
Y is a polymerized diene, and
Z is a polymerized vinyl aromatic when n is 1 and a block copolymer of a polymerized vinyl aromatic and a polymerized diene when n is 2 to 10, 80 to 95% by weight (1) and 20 to 5% by weight (2), respectively, based on the total weight of components (1) and (2); (3) a colorant and/or (4) adjuvant in the absence of a liquid to form a solid mass, (B) shredding the solid mass,
(C) grinding the shredded solid mass by means of particulate media in the presence of a liquid selected from the group consisting of polar liquid having a Kauri-butanol value of at least 30, a nonpolar liquid having a Kauri-butanol value of less than 30, and combinations thereof, to form a dispersion of toner particles in the liquid,
(D) separating the particulate media from the dispersion of toner particles having an average by area particle size of less than 10 μm,
(E) adding to the dispersion during or subsequent to step (C) a charge director compound.

58. A process according to claim 57 wherein during at least one of steps (C) to (E) is added additional liquid selected from the group consisting of nonpolar liquid, polar liquid, and combinations thereof.

59. A process according to claim 30 wherein the thermoplastic resin component is a copolymer of ethylene (89%)/methacrylic acid (11%) having a melt index at 190° C. of 100.

60. An electrostatic liquid developer according to claim 1 wherein the thermoplastic resin component is a copolymer of ethylene (89%)/methacrylic acid (11%) having a melt index at 190° C. of 100.

61. An electrostatic liquid developer according to claim 17 wherein the thermoplastic resin component is a copolymer of ethylene (89%)/methacrylic acid (11%) having a melt index at 190° C. of 100.

* * * * *